Figure 1:
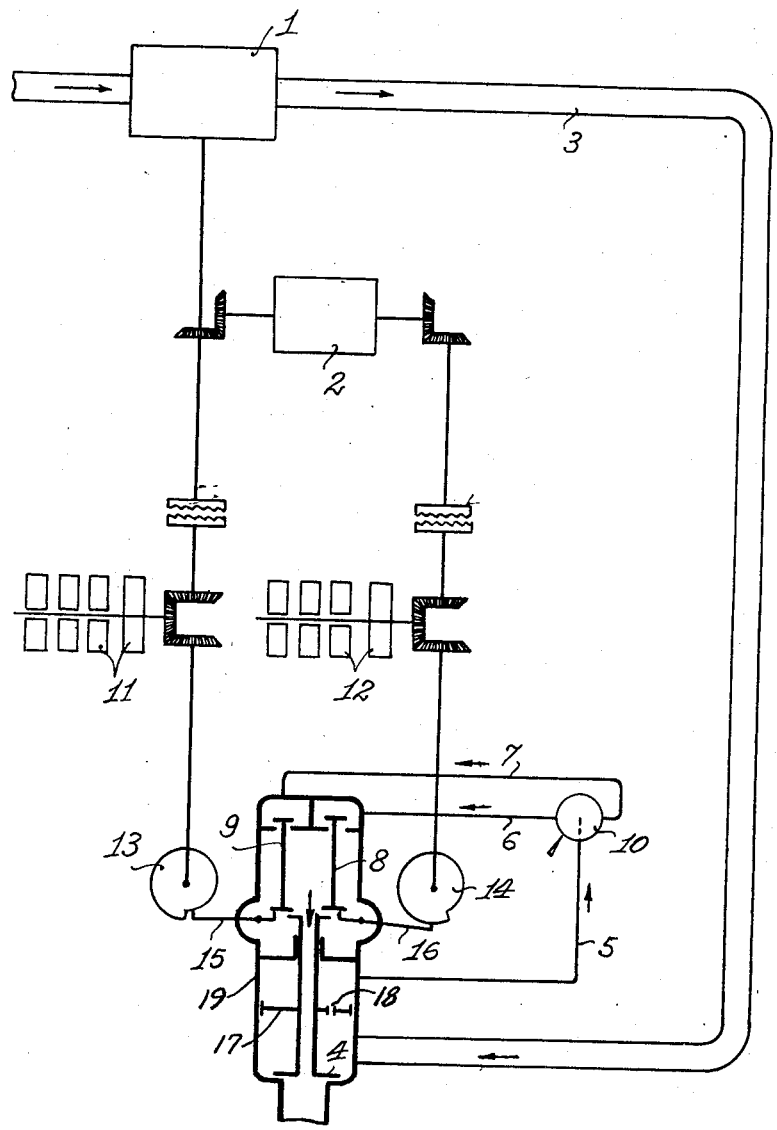

Oct. 6, 1953      R. L. RAMBERT      2,654,506
FLUID MEASURING AND DISPENSING APPARATUS
Filed April 12, 1945      4 Sheets-Sheet 1

Oct. 6, 1953
R. L. RAMBERT
2,654,506
FLUID MEASURING AND DISPENSING APPARATUS
Filed April 12, 1945
4 Sheets-Sheet 2
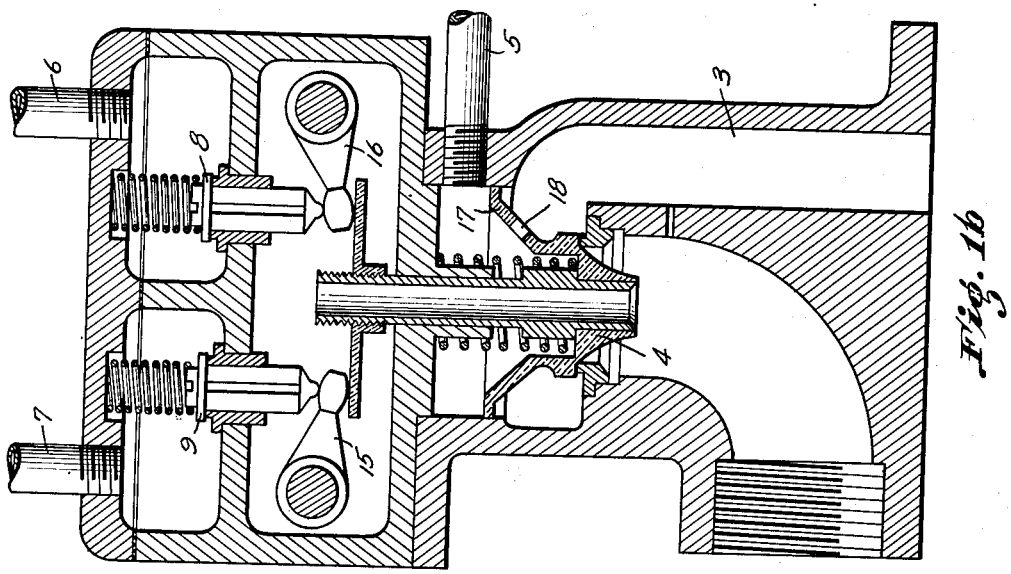
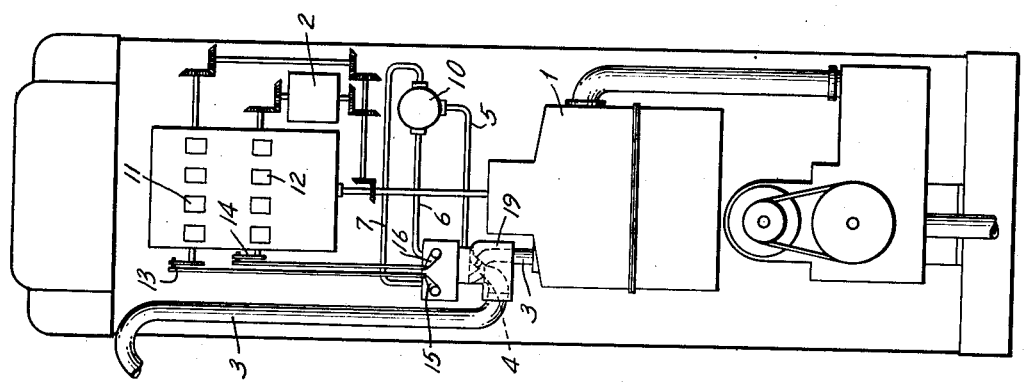
Inventor
R. L. RAMBERT
By Wenderoth, Lind and Ponack
Attorneys

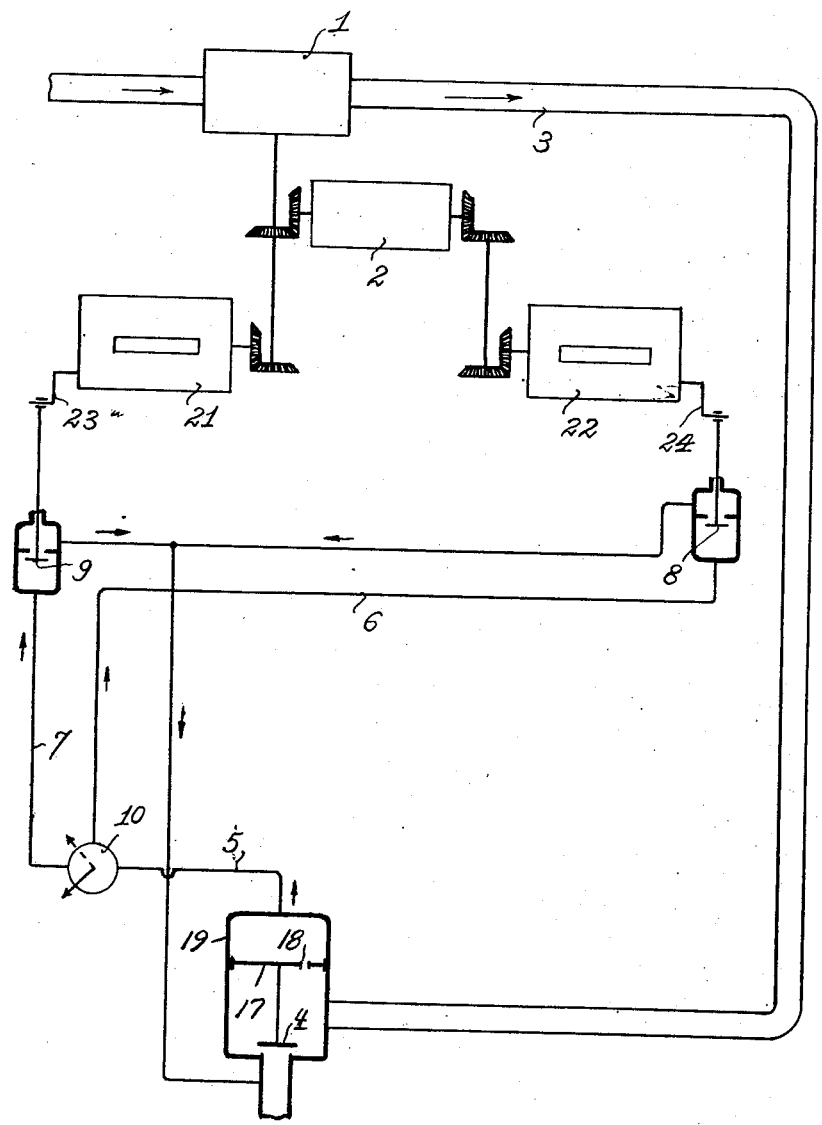

Oct. 6, 1953 R. L. RAMBERT 2,654,506
FLUID MEASURING AND DISPENSING APPARATUS
Filed April 12, 1945 4 Sheets-Sheet 4
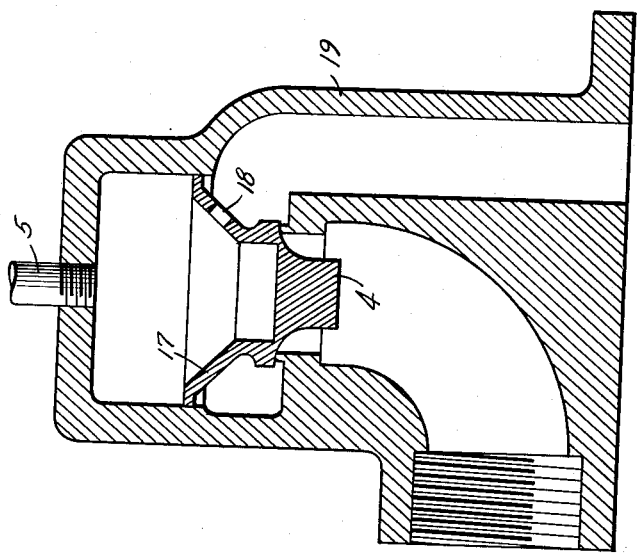
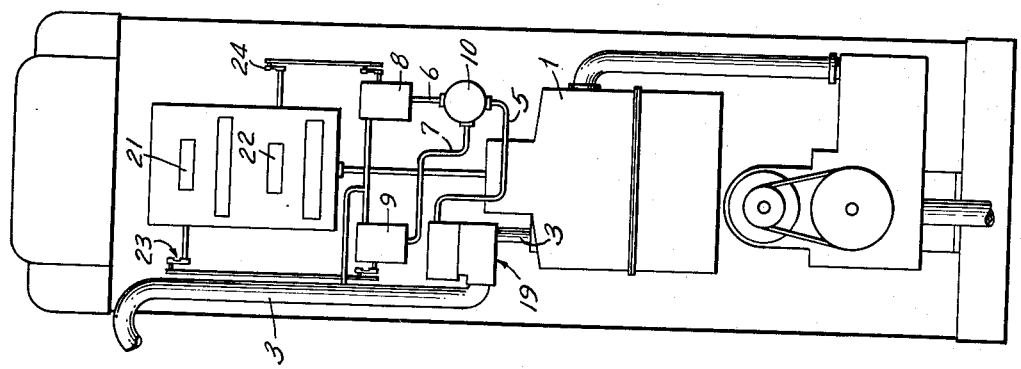
Inventor
R. L. RAMBERT
By Wenderoth, Lind and Ponack
Attorneys Patented Oct. 6, 1953

2,654,506

UNITED STATES PATENT OFFICE 2,654,506

FLUID MEASURING AND DISPENSING APPARATUS

Raymond Lucien Rambert, Gonesse, France, assignor to S. A. T. A. M. Societe Anonyme pour Tous Appareillages Mecaniques, La Courneuve, Seine, France, a society of France Application April 12, 1945, Serial No. 587,978
In France September 13, 1943

Section 1, Public Law 690, August 8, 1946
Patent expires September 13, 1963

2 Claims. (Cl. 222—19)

The present invention relates to the control of the delivery of a fluid from a measuring and dispensing apparatus by means of a valve cooperating with an indicating and measuring device. In the past, a valve has been used for this control of the delivery of the fluid, which control is independent of the manual control which is conducted by the operator. The movements of this controlling valve have been generally controlled by a flap valve located on a bypass to connect those portions of the delivery pipe which are placed above and below said valve.

The present invention is particularly directed to the combination of this valve with the bypass and flap valve whereby measurement and dispensing are conducted for two indicating devices, the first a device indicating the amount of fluid delivered and the second indicating the price or cost of the fluid delivered. The flap valve is controlled by the position which is taken by a member cooperating with the indicating device so as to accomplish the delivery of the predetermined amount of liquid or fluid which is selected.

An object of the invention is to provide a measuring dispensing apparatus comprising essentially a main dispensing conduit having a main valve to close said conduit, two bypasses for the main valve, first and second auxiliary valves for each of the bypasses and a measuring element operating the two mechanisms (price and volume) whereby the manual control of the operator to close either the first and second bypass actuates piston means which cooperating with the predetermining mechanisms permits the delivery to be terminated when a registered amount in terms of either volume or price comes to a zero position.

A further object of the invention is to provide cam or comb predetermining mechanisms in cooperation with the measuring element for the control of the closing of the first and second auxiliary valves associated with the first and second bypasses as indicated in the construction in the preceding paragraph.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

As shown in detail hereinbelow, two bypasses are provided for connecting the two ends of the valve, each end of the valve being provided with a flap valve. Both flap valves are actuated by one of the two indicating devices and cocks are provided to shut one of the bypasses and to simultaneously open the other of the bypasses depending on whether the price or volume indicating device is selected for the control of the valve.

The apparatus includes an indicating or registering device which indicates both in price and volume units the amount of liquid to be delivered. A cam known in the art as a "quick cam" cooperates with the indicating device for the control of the flap valve. The delivery is terminated when the predetermining device is returned to zero by the closing of the main control valve. The predetermining device comprises a plurality of drums corresponding to the different units (multiples) for price and the volume, these plurality of drums associated in units, tens of units, hundreds of units, etc. by means of slow cams or in place of the slow cam there may be used a comb provided with teeth for the control of the devices and the closure of the valve. The comb means is preferred for the control of the above-mentioned flap valve.

In connection with that more detailed description, there is shown in the drawings, in Figures 1, 1a and 1b diagrammatic views partly in section of an embodiment of the invention; in Figures 2, 2a and 2b diagrammatic views partly in section of an embodiment of the invention.

In Figures 1, 1a, 2 and 2a the volumetric metering device for the liquid measuring and dispensing apparatus is designated by reference numeral 1. As shown in the figures, the apparatus of the invention comprises change gear device 2, cooperating with means for the control of the flap valves 8 and 9, a delivery pipe 3 from the meter 1, the main valve 4 controlling the fluid delivery of the apparatus, bypass 5 connecting the portions of the delivery pipe above and below main valve 4, branches 6 and 7 of bypass 5, flap valves 8 and 9 for controlling the flow in branches 6 and 7 and a three-way cock 10 located in the bypass 5 at the beginning of branches 6 and 7 to permit the alternate connection of either one of these branches with the bypass 5, while the other bypass is closed.

In Figures 1 and 1a (face view) the embodiment is illustrated wherein the measuring device or meter 1 drives the two indicating devices, the first device being the volume indicator 11 and the second device being the price indicator 12. Each of these indicating devices comprises a quick cam 13 and 14.

Valve 4 (Figs. 1, 1b, 2 and 2b) is the type shown in Fig. 2 of applicant's co-pending application Serial No. 598,324, now U. S. Patent No. 2,590,440. The cam 13 keeps the flap valve 9 open by means of lever 15. The flap valve closes when one end of the lever falls into the notch of cam 13.

The valve 4 is urged into its closed position by the current of fluid in the pipe 3 (Figs. 2 and 2b). The valve 4 is fixed to a piston 17 movable in a cylindrical portion of the valve box containing the valve 4. The piston 17 has a calibrated orifice 18 communicating with its two faces. The lower face of the piston 17 which is subjected directly to the pressure of the upstream fluid is larger than the face of the valve 4 so that as soon as there is a pressure upstream of the valve 4 in the pipe 3 the resultant of forces due to such pressure upon the said face of the piston 17 and upon the face of the valve 4 tends to open the latter. The pressure upon the other face of the piston 17 varies according to the value of the flow in the bypasses 5, 6 or 5, 7 which are open. In fact when this flow is nil (this is the case when the valves 8 and 9 are closed) the pressure upon the upper face of the piston 17 is equal to the upstream pressure and neutralizes that which is exercised upon the lower face of the piston 17. In this case the multiple equipment formed by the valve 4 and the piston 17 is led into the closing position of the valve 4. When the flow in one of the bypasses 5, 6 or 5, 7 increases, the pressure of the fluid upon the upper face of the piston 17 diminishes and a moment is reached where the resultant of the forces of the pressure of the fluid upon the movable elements 4, 17 (pressure of the fluid upon the upper face of the valve 4 and upon the two faces of the piston 17) results in a force which is increasing. The valve 4 then opens.

Flap valves 8 and 9 (Figs. 1b and 2) are closed by the corresponding lever 16 cooperating with the cam 14. The stem of the valve 4 coacts with the stems of the valves 8 and 9 in such a way that the opening of valve 4 causes flap valves 8 and 9 to open and remain open even during the passage of levers 15 and 16 in front of the notch of cams 13 and 14, this condition is obtained as long as the operator has not reduced the delivery to less than that predetermined quantity as obtained by the partial closure of delivery pipe 3.

The operator partially closes delivery pipe 3 just before the appearance of the pre-selected number of units on the indicating device 11 or 12 and in these indicating devices a complete rotation of cams 13 and 14 corresponds exactly to one unit. The partial closing of the pipe 3 brings about a slowing of the flow in the branch 5, 6 or 5, 7 which is maintained open by the valve 10. This slowing of the flow is sufficient to increase the pressure upon the upper face of the piston 17 (Figs. 1, 1b, 2 and 2b) until a value is reached above that which brings about the closing of the valve 4 as explained above, but the delivery goes on at low speed through bypass 5 and branches 6 or 7 connected thereto in accordance with the adjustment indicated above.

The major quantity of fluid delivered is delivered at normal speed. This speed is readily observed in accordance with the number of the indicating units. It is still possible for the operator to interrupt the delivery just before the particular desired unit on the indicating device is reached. To make this interruption, the operator adjusts cock 10 so that either branch 6 (volume unit) or branch 7 (price units) are brought into play just prior to terminating the delivery.

When the customer asks for 10 liters of a liquid, such as gasoline, at a unit price of 3.95 francs per liter or when the customer asks for a quantity of gasoline costing 40 francs, the above adjustments are made and the precise amount requested is delivered.

In Figures 2, 2a (face view) and 2b are shown, the meter 1 which drives two predetermining devices, device 21 for volume and the other device for price, and each of these devices comprise a comb 23 or 24 respectively associated therewith. These combs open or shut flap valves 8 or 9 respectively. The closing of flap valve 8 or 9 corresponding to branch 6 or 7 and connected to pipe 5 causes the closure of valve 4 since the pressures upon the two faces of piston 17 are equal and the fluid flow pushes valve 4 into its closing position. Thus it is possible to stop the delivery when the particular pre-selected number in terms of price or volume is actually delivered according to the position of cock 10 which closes either branch 6 or 7.

The present invention may be modified in a manner which is clear to those skilled in the art without departing from the arrangement which has been described hereinabove. If more than two indicating devices are desired, there will be provided as many bypasses as there are indicating devices and the principle of control as outlined above may be adapted for this construction.

Having thus disclosed the invention what is claimed is:

1. A measuring and dispensing apparatus for fluids comprising essentially a main dispensing conduit, a measuring element, a main valve capable of closing said conduit, two by-passes by passing the main valve, a first and a second auxiliary valves capable of closing respectively the said first and second by-passes, two cam indicating mechanisms operated by said measuring element, means operated by said two mechanisms to close respectively the first and second auxiliary valves, means controlled by the operator for closing either the first by-pass or the second by-pass, a piston of a larger cross section than that of the main valve integral with said main valve, one of the faces of said piston being subjected to the action of the pressure prevailing above the main valve, which action tends to open the latter while the other face is subjected to the action of the pressure at a point, of the said by-passes located upon the above said first and second auxiliary valves, the action of the pressure upon this latter face tending to close the main valve and bring about the closure of the latter when the flow from the by-passes falls below a maximum value and the opening of said valve when the flow from said by-passes is above such maximum value and a closing valve placed upon the main dispensing conduit below the main valve controlled by the operator and capable of closing partially said main conduit and to reduce in such position the flow in the first and second by-passes below the above said maximum value which will bring about the closing of the main valve.

2. A measuring and dispensing apparatus for fluids comprising essentially a main dispensing conduit, a measuring element, a main valve capable of closing said conduit, two by-passes by passing the main valve, a first and a second auxiliary valves capable of closing respectively the said first and second by-passes, two comb predetermining mechanisms operated by said measuring element, means operated by said comb predeterminating mechanisms in order to close respectively the first and second auxiliary valves, means controlled by the operator for closing either said first by-pass or second by-pass a piston of a larger cross section than that of the main valve integral with said main valve, one of the faces of said piston being subjected to the action of the pressure prevailing above the main valve, which action tends to open the latter while the other face is subjected to the action of the pressure at a point of the said by-passes located upon the above said first and second auxiliary valves, the action of the pressure upon this latter face tending to close the main valve and bring about the closure of the latter when the flow from the by-passes falls below a maximum value and the opening of said valve when the flow from said by-passes is above such maximum value and a closing valve placed upon the main dispensing conduit below the main valve controlled by the operator and capable of closing partially said main conduit and to reduce in such position the flow in the first or second by-pass below the above said maximum value which will bring about the closing of the main valve.

RAYMOND LUCIEN RAMBERT.

References Cited in the file of this patent

UNITED STATES PATENTS

| Number | Name | Date |
| --- | --- | --- |
| 1,772,903 | Lawson | Aug. 12, 1930 |
| 1,868,444 | Bechtold | July 19, 1932 |
| 2,161,920 | Fraser | June 13, 1939 |
| 2,227,830 | Hazard | Jan. 7, 1941 |
| 2,289,867 | Berck | July 14, 1942 |
| 2,302,201 | Fraser | Nov. 17, 1942 |
| 2,305,221 | Mangan | Dec. 15, 1942 |